United States Patent
Sasahara et al.

(10) Patent No.: US 6,284,815 B1
(45) Date of Patent: *Sep. 4, 2001

(54) NON-ASBESTOS FRICTION MATERIAL

(75) Inventors: Shigemi Sasahara; Takayuki Watanabe, both of Saitama (JP)

(73) Assignee: Akebono Brake Industry Co. Ltd., Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/883,336

(22) Filed: Jun. 26, 1997

(30) Foreign Application Priority Data

Jun. 27, 1996 (JP) .................................................. 8-167253

(51) Int. Cl.⁷ .................................. C08J 5/14; C09K 3/14
(52) U.S. Cl. .......................... 523/149; 523/153; 523/155; 524/35; 524/445; 106/36
(58) Field of Search .................................. 523/149, 153, 523/155; 524/445, 35; 106/36

(56) References Cited

U.S. PATENT DOCUMENTS

| | | | |
|---|---|---|---|
| 4,119,591 | * 10/1978 | Aldrich | 523/156 |
| 4,356,137 | 10/1982 | Guzy et al. | 264/137 |
| 4,374,211 | * 2/1983 | Gallagher et al. | 523/156 |
| 4,785,029 | 11/1988 | Honma et al. | 523/153 |
| 4,866,107 | * 9/1989 | Doxsee et al. | 523/153 |
| 5,049,191 | * 9/1991 | Pflug et al. | 106/36 |
| 5,122,550 | * 6/1992 | Schmitt | 523/149 |
| 5,520,866 | * 5/1996 | Kaminski et al. | 264/112 |
| 5,576,358 | * 11/1996 | Lem et al. | 523/153 |

FOREIGN PATENT DOCUMENTS

| | | |
|---|---|---|
| 0 394 608 | 1/1990 | (EP) . |
| 0672842A3 | 3/1995 | (EP) . |

OTHER PUBLICATIONS

English Abstract of Japanese Application No. JP880283753, dated May 21, 1990.

English Abstract of Japanese Publication No. 02088678, published Mar. 28, 1990.

English Abstract of Japanese Application No. JP880326043, dated Jul. 4, 1990.

\* cited by examiner

Primary Examiner—Terrel Morris
Assistant Examiner—John J. Guarriello
(74) Attorney, Agent, or Firm—Finnegan, Henderson, Farabow, Garrett & Dunner, L.L.P.

(57) ABSTRACT

A non-asbestos friction material is disclosed, which comprises a non-asbestos fibrous reinforcement, a thermosetting resin binder, and a filler as the main components, wherein the fibrous reinforcement is a combination of plural kinds of non-asbestos fibers and contains sepiolite fibers, cellulose fibers, and an acryl pulp as the fibrous reinforcement. The friction material of the present invention is excellent in fade characteristics, stability of effectiveness, etc., and low in cost.

3 Claims, No Drawings

NON-ASBESTOS FRICTION MATERIAL

FIELD OF THE INVENTION

The present invention relates to non-asbestos friction materials suitable for use in disc brake pads, drum brake linings, clutch facings, brake blocks and the like for industrial machinery, railway vehicles, commercial vehicles, and automobiles.

BACKGROUND OF THE INVENTION

Friction materials (disc brake pads, drum brake linings, clutch facings, etc.) for brakes and clutches generally contain a fibrous reinforcement such as organic fibers, inorganic fibers, metal fibers, etc., a thermosetting resin binder such as a phenolic resin, etc., and a filler such as a friction modifier (resin dust, rubber dust or the like), a solid lubricant (graphite, molybdenum disulfide and the like), etc., as the main components.

As the fibrous reinforcement, asbestos was conventionally used for such friction materials for a long time. However, asbestos, which is a carcinogenic substance presents safety and health problems during both manufacture and use. Under these circumstances, non-asbestos friction materials without asbestos have been widely used. In such non-asbestos friction materials, as the fibrous reinforcement, fibrillated aramid fibers (aramid pulp) or a combination of the aramid fibers and glass fibers have been widely used.

Fibrillated aramid fibers have the features that they have a light weight and a high strength as compared with metal fibers, etc., and have a high heat resistance in spite of organic fibers. However, because the aramid fibers are generally expensive, there is a problem that the friction materials using the aramid fibers have a large disadvantage in cost as compared with asbestos series friction materials. Accordingly, there is a need for non-asbestos friction materials having the same performance in heat resistance, mechanical strength, etc., as the friction material with the aramid fibers. But non-asbestos friction materials satisfying all of thermal and mechanical strength, effectiveness, fade characteristics, friction characteristics, etc., and cost have not yet been developed.

SUMMARY OF THE INVENTION

An object of the present invention is to provide a friction material which is excellent in fade characteristics, stability of effectiveness, etc., and low in cost.

As the result of various investigations for achieving the above-described object, the inventors have discovered that the above-described object can be achieved by using at least sepiolite fibers, cellulose fibers, and an acryl pulp in combination as the fibrous reinforcement That is, according to the first aspect of the present invention, there is provided a non-asbestos friction material comprising a non-asbestos fibrous reinforcement, a thermosetting resin binder, and a filler as the main components, wherein the fibrous reinforcement is a combination of plural kinds of non-asbestos fibers and contains at least sepiolite fibers, cellulose fibers, and an acryl pulp as the fibrous reinforcement.

Also, according to the second aspect of the present invention, there is provided the above-described non-asbestos friction material of this invention containing from 1 to 20% by weight of the sepiolite fibers, from 1 to 25% by weight of the cellulose fibers, and from 1 to 10% by weight of the acryl pulp to the total amount of the friction material.

Furthermore, according to the third aspect of the present invention, there is provided the above-described non-asbestos friction material, wherein the weight ratio of the sepiolite fibers/the cellulose fibers is from 1/1 to 1/3.

Moreover, according to the fourth aspect of the present invention, there is provided the above-described non-asbestos friction material, wherein the friction material contains aramid fibers in an amount of not more than 5% by weight to the total amount of the friction material and in particular, does not substantially contain aramid fibers.

Also, according to a fifth aspect of the present invention, there is provided the above-described non-asbestos friction material containing from 5 to 40% by weight of the non-asbestos fibrous reinforcement, from 5 to 20% by weight. of the thermosetting resin binder, and from 30 to 80% by weight of the filler.

The friction material of the present invention can maintain the same strength, heat resistance, effectiveness, fade characteristics, abrasion characteristics, etc., as the non-asbestos friction material containing a large amount of aramid fibers even by reducing the using ratio of the aramid fibers by using a combination of the sepiolite fibers, the cellulose fibers, and the acryl pulp as the fibrous reinforcement.

DETAILED DESCRIPTION OF THE INVENTION

The present invention is described in detail below.

The friction material of the present invention is a non-asbestos friction material using non-asbestos fibers as the fibrous reinforcement, thermosetting resin binder, and filler as the main components.

In the present invention, the fibrous reinforcement is a combination of plural kinds of non-asbestos fibers and contains at least sepiolite fibers, cellulose fibers, and an acryl pulp as the fibrous reinforcement.

Sepiolite is a natural fibrous clay mineral, the main component is hydrous magnesium silicate, and also sepiolite further contains calcium oxide, magnesium oxide, aluminum oxide, silicon dioxide, iron oxide, etc., together with free water. The cross section of the single fiber of sepiolite has a crystal structure of alternatively accumulating talc and has a high adsorption effect owing to numberless fine pores existing in the fibers. Also, sepiolite has a thixotropy and when sepiolite is strongly stirred in water or a resin, it shows a thickening effect. Also, when the shearing force is large, it becomes a low viscosity, while when the shearing force is small, it becomes a high viscosity. Furthermore, when sepiolite is granulated with water and dried, solid particles are obtained and when the solid particles are heated, they become a ceramic-like material while gradually dehydrating and show a plasticity as kaolin. As the sepiolite fibers used in the present invention, it is preferred that the average fiber length thereof is from 30 to 50 µm and the average fiber diameter is from 0.1 to 0.4 µm.

There are no particular restrictions on the average fiber length and the average fiber diameter of the cellulose fibers used in the present invention but the average fiber length is preferably from 2 to 10 mm, and particularly preferably from 4.5 to 6.5 mm and the average fiber diameter is preferably from 10 to 100 µm, and particularly preferably from 30 to 40 µm. Such cellulose fibers are produced, for example, by a viscose method from a pulp.

The acryl pulp used in the present invention can be obtained from, as the raw material, acrylic fibers generally known as fibers for clothing, by fibrillating the acrylic fibers with a beater for paper manufacture, such as, for example, disc refiner, etc. Also, an acryl pulp having fibers which have almost parallel straw-form voids along the length direction of the fibers as trunks in the fibers, wherein many fine whisker-like filaments are branched from the trunks and said trunks are split in the length direction of the trunks to form plural fibers can be used.

Such acrylic fibers are made up of an acrylic copolymer composed of at least 60% by weight acrylonitrile and not more than 40% by weight an ethylenic monomer copolymerizable with acrylonitrile or a mixture of two or more kinds of such acrylic copolymers.

The ethylenic monomer copolymerizable with acrylonitrile includes, for example, acrylic acid or methacrylic acid and the esters thereof (such as methyl acrylate, ethyl acrylate, methyl methacrylate, ethyl methacrylate, etc.), vinyl acetate, vinyl chloride, vinylidene chloride, acrylamide, methacrylamide, methacrylonitrile, allylsulfonic acid, methallylsulfonic acid, and styrenesulfonic acid.

There is no particular restriction on the freeness of the acryl pulp used in this invention, said freeness being the index of showing the extent of beating pulp in the paper manufacturing industry and the freeness can be properly selected according to the properties of the friction material but it is preferred to use the acryl pulp having the freeness of the range of from about 600 to 200 cc.

The content of the sepiolite fibers is preferably from 1 to 20% by weight, and more preferably from 2 to 15% by weight to the total amount of the friction material. In the range of the compounding amount, lowering of fade characteristics and strength after the heat deterioration can be prevented.

The content of the cellulose fibers is from 1 to 25% by weight, and more preferably from 2 to 20% by weight to the total amount of the friction material. In the range of the compounding amount of the cellulose fibers, the stability of effectiveness is good and also the heat resistance is not lowered owing to the use of a too much amount thereof.

The content of the acryl pulp is preferably from 1 to 10% by weight to the total amount of the friction material. In the range of the compounding amount, lowering of fade characteristics and strength after the heal deterioration does not occur owing to the use of a too much amount thereof.

Also, in the present invention, it is preferred that the weight ratio of the sepiolite fibers/the cellulose fibers is from 1/1 to 1/3. The addition of cellulose fibers tends to lower fade characteristics but by using together with the sepiolite fibers in the above-described range, lowering of fade characteristics can be prevented.

For the fibrous reinforcement, in addition to the sepiolite fibers, the cellulose fibers, and the acryl pulp described above, metal fibers such as steel fibers, copper fibers, brass fibers, etc.; organic fibers such as aromatic polyamide fibers (aramid fibers, etc.; as commercially available products, "KEVLAR" (trade name, made by E.I. Dupont), etc.}, flame resisting acryl fibers, etc.; non-asbestos inorganic fibers such as potassium titanate fibers, glass fibers, alumina fibers, carbon fibers, rock wool, etc. They may be used singly or as a combination of them.

There is no particular restriction on the using amount of the whole fibrous reinforcement but the using amount is preferably from 5 to 50% by weight, and more preferably from 10 to 45% by weight to the total amount of the friction material. In the range, the dispersibility of the filler and the preforming property of the friction material can be maintained without reducing friction characteristics, abrasion characteristics, etc.

The thermosetting resin binder used in the present invention has a role of binding the compounding components of the friction material and a phenolic resin, a melamine resin, an epoxy resin, a cyanic acid ester resin, etc., are used. In these resins, a phenolic resin is preferably used. There is no particular restriction on the using amount of the thermosetting resin binder but the using amount is preferably from 5 to 20% by weight, and more preferably from 10 to 20% by weight to the total amount of the friction material.

The filler used in the present invention includes organic fillers such as resin dust (e.g., cashew dust), etc.; hard particles of metal oxides such as alumina, silica, zirconia, chromium oxide, etc.; metallic filler such as copper particles, brass particles, iron particles, etc.; an inorganic filler such as flaky inorganic materials (vermiculite, mica and the like), inorganic compounds (barium sulfate, calcium carbonate and the like); solid lubricant such as graphite, molybdenum disulfide, etc.

The compounding amount of the filler is preferably from 30 to 80% by weight, and more preferably from 40 to 80% by weight to the total amount of the friction material.

The friction material of the present invention is produced by the following process using the compounded composition containing the fibrous reinforcement, the thermosetting resin binder, and the filler described above.

First, the above-described compounded composition is uniformly stirred and mixed, after preforming the composition into a tablet form, etc., the tablets are placed in a heat mold, and heat molded by pressing under heat to provide a molded product having a definite thickness and density. In addition, after preforming and before heat molding, the composition can be preheated.

Then, the product obtained is heat-treated and further subjected to finishing such as form-processing, etc., to provide the friction material of the present invention.

There are no particular restrictions on the conditions of these steps described above and the conditions are properly selected according to ordinary methods but it is general that practically the preforming is usually carried out at a facial pressure of from about 100 to 500 kgf/cm$^2$, the heat molding is carried out at a temperature of from 130 to 180° C. and a facial pressure of from about 200 to 1000 kgf/cm$^2$, and the heat treatment is carried out at a temperature of from about 150 to 300° C.

The preforming is carried out for reducing the heat energy loss because when the compounded composition after stirring and mixing is directly heat molded, the stroke of the heat press becomes large and it is required to make the heat mold larger. Because after preforming, it is necessary that the product is transferred to a heat mold or the product is temporarily stored, it is required that the preformed product keeps a definite form. In the case of the friction material of the present invention, the strength of the product after preforming is high and thus the friction material is excellent in the preforming property.

The present invention is explained by the following examples.

EXAMPLES 1 TO 3 AND COMPARATIVE EXAMPLES 1 TO 5

The compounding components of the kinds and the amounts shown in Table 1 below were sufficiently stirred and mixed, the compounded composition obtained was preformed in a mold at a facial pressure of 200 kgf/cm², and then heat molded in a heat mold at a facial pressure of 200 kgf/cm² and a temperature of 150° C., the molded product obtained was heat treated at a temperature of from 180 to 200° C., and further was subjected to form-processing such as polishing, etc., to provide each friction material piece having a size applicable to the following evaluation tests.

Then, each test piece described above was fixed to an actual vehicle and the following evaluation tests were performed.

(1) Filler Holding Power

After stirring and mixing the raw material composition for the friction material, the composition was passed through a sieve (10 to 35 mesh) and the weight of the filler remained on the sieve and the weight of the filler passed through the sieve were measured (Ro-Tap Shaker). The filler holding power was evaluated in such a manner that the case that the weight of the remained filler was 80% or more of the total filler was evaluated as o (the filler holding power was good) and the case that the weight of the remained filler was less than 80% was evaluated as x (the filler holding power was insufficient).

(2) Preforming Property

The strength of the preliminary product was evaluated in such a manner that the case that when the product after preforming (preliminary product) was held by hand, the product was not crumbled was evaluated as o and the case that 5% or more of the preliminary product was crumbled was evaluated as x.

(3) Shearing Strength

According to JASO-C-444-78, the frictional direction of the test piece (30 mm×10 mm×8 mmt) was matched with the load direction, the test piece was fixed to a jig, sheared at a pressing speed of 2 mm.minute, and the shearing strength was obtained by dividing the maximum shearing load of the test piece by the cross-sectional area of the test piece. Also, after heating the same test piece at a temperature of 300° C. for one hour, the same shearing test was applied to the test piece, and the shearing strength of the test piece after the heat deterioration was determined.

(4) Fade Characteristics (fade minimum friction coefficient)

A friction performance test was carried out on each test piece. That is, fade test was carried out using the test piece (area 8 cm²) under the conditions of the initial speed of braking (V) of 60 km/hour, the deceleration of 0.3 G, the braking number of 15 times, and the maximum temperature of from 300 to 350° C. and the fade minimum friction coefficient ($\mu$) was determined.

(5) Stability of Effectiveness (changing ratio of braking effectiveness: %)

A full size dynamometer test was carried out. That is, fade test was repeated 15 cycles under the condition of the initial speed of braking (V) of 50 km/hour, the deceleration of 0.3 G, the braking number of 35 times, and the maximum temperature of from 250 to 300° C. and the braking effectiveness at the 15 cycle was measured and from the measured value of the 1st braking effectiveness and the maximum value (maximum braking effectiveness) of the braking effectiveness values after the 2nd cycle, the changing ratio (%) of braking effectiveness was obtained by the following equation.

Changing ratio (%)=(A)/(B)×100

(A): Maximum braking effectiveness
(B): Braking effectiveness at the 1st cycle

The results of the evaluation tests are shown in Table 1 below.

TABLE 1

|   |   | Example | | |
|---|---|---|---|---|
|   |   | 1 | 2 | 3 |
| (A) | Fibrous reinforcement (wt. %) | | | |
|   | Aramid pulp[*1] | — | — | — |
|   | Acryl pulp | 3 | 3 | 3 |
|   | Sepiolite fiber | 2 | 5 | 10 |
|   | Cellulose fiber | 2 | 15 | 20 |
|   | Glass fiber | 5 | — | — |
|   | Binder (wt. %) | | | |
|   | Phenolic resin | 15 | 15 | 15 |
|   | Filler (wt. %) | | | |
|   | Calcium carbonate | 63 | 52 | 42 |
|   | Cashew dust | 10 | 10 | 10 |
| (B) | Filler holding power | o | o | o |
|   | Preforming property | o | o | o |
|   | Shearing strength (kgf/cm²) | 98 | 106 | 118 |
|   | Shearing strength (kgf/cm²) (after heat deterioration) | 81 | 92 | 103 |
|   | Fade min. friction coefficient | 0.33 | 0.30 | 0.33 |
|   | Stability of effectiveness (changing ratio) | 103 | 98 | 100 |
|   | Cost[*2] | 25 | 45 | 60 |

|   | Comparative Example | | | | |
|---|---|---|---|---|---|
|   | 1 | 2 | 3 | 4 | 5 |
| (A) Fibrous reinforcement | | | | | |
| Aramid pulp[*1] | — | — | — | — | 10 |
| Acryl pulp | 1 | 5 | 10 | 3 | — |
| Sepiolite fiber | — | — | — | 10 | — |
| Cellulose fiber | — | — | — | — | — |
| Glass fiber | 5 | 5 | 5 | 5 | 5 |
| Binder (wt. %) | | | | | |
| Phenolic resin | 15 | 15 | 15 | 15 | 15 |
| Filler (wt. %) | | | | | |
| Calcium carbonate | 69 | 65 | 60 | 57 | 60 |
| Cashew dust | 10 | 10 | 10 | 10 | 10 |
| (B) Filler holding power | x | o | o | o | o |
| Preforming property | x | o | o | o | o |
| Shearing strength (kgf/cm²) | 80 | 102 | 119 | 108 | 113 |
| Shearing strength (after heat deterioration) | 78 | 78 | 67 | 101 | 105 |
| Fade min. friction coefficient | 0.33 | 0.26 | 0.21 | 0.42 | 0.35 |
| Stability of effectiveness (changing ratio) | 118 | 91 | 82 | 60 | 106 |
| Cost[*2] | 5 | 25 | 50 | 30 | 100 |

[*1]: Aramid pulp: Twaron (trade name, made by Akzo Co.; heat resisting temperature 460° C.)
[*2]: Cost: The values when the cost of Comparative Example 5 was defined as 100.
(A): Compounding amount
(B): Evaluation items As is clear from the results of the evaluation tests, it can be seen that by simply changing the aramid pulp to the acryl pulp, lowering of the strength by heat shrinkage occurs by the low heat resistance of the acryl pulp and with the increase of the amount of the acryl pulp, fade characteristics are lowered (Comparative Examples 1 to 3). When the sepiolite fibers are used for overcoming low heat resistance of the acryl pulp, fade characteristics and strength after the heat deterioration can be maintained. However, by only acryl pulp and sepiolite, in repeated braking, the braking effectiveness is gradually increased and the stability of effectiveness is reduced (Comparative Example 4). On the other hand, when cellulose fibers having a relatively low heat resistance are further added to them, the increase of the braking effectiveness is restrained and the friction materials are also excellent in stability of effectiveness (Examples 1 to 3).

As described above, the friction material of the present invention is excellent in fade characteristics and stability of effectiveness and also low in cost and thus the friction material is industrially very useful.

What is claimed is:

1. A non-asbestos friction material comprising a non-asbestos fibrous reinforcement, a thermosetting resin binder, and a filler as the main components, wherein said fibrous reinforcement is a combination of plural kinds of non-asbestos fibers and contains, as the fibrous reinforcement, from 1 to 20% by weight of sepiolite fibers, from 1 to 25% by weight of cellulose fibers, and from 1 to 10% by weight of acryl pulp, wherein the weight ratio of the sepiolite fibers to cellulose fibers is from 1/1 to 1/3, said fibrous reinforcement optionally containing other materials.

2. The non-asbestos friction material according to claim 1, wherein the friction material contains aramid fibers in an amount of not more than 5% by weight to the total amount of the friction material.

3. The non-asbestos friction material according to claim 1, wherein the friction material contains from 5 to 40% by weight of the non-asbestos fibrous reinforcement, from 5 to 20% by weight of the thermosetting resin binder, and from 30 to 80% by weight of the filler.

* * * * *